(12) United States Patent
Choi et al.

(10) Patent No.: US 6,868,693 B2
(45) Date of Patent: Mar. 22, 2005

(54) AIR CONDITIONING SYSTEM

(75) Inventors: Ho Seon Choi, Seoul (KR); Gi Seop Lee, Incheon-si (KR); Kwan Ho Yum, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/754,534

(22) Filed: Jan. 12, 2004

(65) Prior Publication Data

US 2004/0237571 A1 Dec. 2, 2004

(30) Foreign Application Priority Data

May 28, 2003 (KR) .................................. 10-2003-0034085

(51) Int. Cl.[7] .............................................. F25D 17/06
(52) U.S. Cl. .............................. 62/411; 62/418; 454/296
(58) Field of Search .......................... 62/411, 417, 418, 62/407, 404, 259.1; 454/296, 237

(56) References Cited

U.S. PATENT DOCUMENTS 5,595,068 A * 1/1997 Amr ............................ 62/418
5,987,908 A * 11/1999 Wetzel ...................... 62/259.1
6,131,653 A * 10/2000 Larsson ...................... 165/228

* cited by examiner

Primary Examiner—Melvin Jones
(74) Attorney, Agent, or Firm—Greenblum & Bernstein, P.L.C.

(57) ABSTRACT

The present invention provides an air conditioning system including an outdoor unit, an indoor unit, and air supply and air discharge duct. The outdoor unit includes a compressor and an outdoor heat exchanger, and the indoor unit in a ceiling includes an indoor heat exchanger, a fan, guide means, and a preheat exchanger. The indoor heat exchanger has a space therein in communication with a room, and the fan is in the space for drawing air and discharging through the indoor heat exchanger. The guide means is provided on an underside of the indoor heat exchanger, for guiding the external air to the room through the fan, and the room air to an outside of the room. The preheat exchanger is arranged adjacent to, and in communication with the guide means, for indirect heat exchange of the external air and room air passing therethrough. The air supply duct and the air discharge duct are respectively connected to the preheat exchanger, for guiding the external air to the room, and the room air to the outside of the room.

32 Claims, 8 Drawing Sheets

AIR CONDITIONING SYSTEM

This application claims the benefit of the Korean Application No. P2003-0034085 filed on May 28, 2003, which is hereby incorporated by reference.

BACKGROUND OF THE INVENTION

1. Field of the Invention

The present invention relates to air conditioning systems, and more particularly, to an air conditioning system, in which an indoor unit installed on a ceiling, and a duct for ventilation are combined into one compact unit.

2. Background of the Related Art

The air conditioner is an appliance for cooling or heating a room by using a property of refrigerant in which the refrigerant discharges or absorbs heat to/from an environment when the refrigerant undergoes a phase change.

In general, the aid conditioner is provided with an indoor unit and an outdoor unit, wherein the air conditioner having the indoor unit and the outdoor unit combined into one unit is called as a unit type air conditioner, and the air conditioner having the indoor unit and the outdoor unit fabricated individually is called as a separate type air conditioner.

As a typical example of the unit type air conditioner, there is a window type air conditioner, and as the separate type air conditioners, there are a ceiling type air conditioner, a wall mounting type air conditioner, and a package type air conditioner. In a case of the ceiling type air conditioner, the indoor unit is installed in the ceiling, in a case of the wall mounting type, the indoor unit is mounted on a wall, and in a case of the package type air conditioner, the indoor unit stands on a floor in a room.

In general, the air conditioner includes a compressor, a condenser, an expansion device, and an evaporator. The compressor compresses low temperature/low pressure gas refrigerant to high temperature/high pressure refrigerant, and makes the refrigerant to pass through different units. The condenser condenses the gas refrigerant from the compressor into a liquid refrigerant. In this instance, as the refrigerant discharges heat when the refrigerant is condensed, the condenser discharges heat to an environment. As the heat is discharged from the condenser to the room, the room can be heated.

In general, as the expansion device, expanding the condensed refrigerant by decompression, capillary tubes are used. The evaporator vaporizes the expanded refrigerant, when the refrigerant absorbs heat to cool down air around the evaporator. When such a cooled down is discharged to the room, the room can be cooled down.

In the meantime, for reducing heat loss during use of the air conditioner, the room is closed. Air in such a closed room is polluted gradually as time passes by. For an example, breathing of persons in the room makes a carbon dioxide content in the room air higher, and there is much dust circulating in the dry air. Therefore, after using the air conditioner for a time period, it is required to supply fresh external air to the room. What is used for this is the very ventilation device.

Most of known related art ventilation device employs a system in which room air is only discharged to an outside of the room forcibly by using a fan. In this case, it is required to leave the window open for ventilation. However, when the room air is only discharged by one fan forcibly, cold or hot air is discharged to the outside directly, and external air is introduced into the room through an opened door or window, directly. Accordingly, there is a great loss of heat in the ventilation, to require, not only much energy, but also a long time to cool or heat the room again.

Moreover, the sudden introduction of hot or cold air from the outside to the inside of the room causes a sudden change of a room temperature, such that persons in the room feel unpleasant. Moreover, the opening of door or window without fail required when the ventilation device that discharges room air to outside of the room is in operation causes inconvenience.

SUMMARY OF THE INVENTION

Accordingly, the present invention is directed to an air conditioning system that substantially obviates one or more of the problems due to limitations and disadvantages of the related art.

An object of the present invention is to provide an improved air conditioning system which can recover heat from air discharged to an outside of room during ventilation.

Other object of the present invention is to provide an improved air conditioning system which has a compact indoor unit to be installed in the ceiling.

Another object of the present invention is to provide an improved air conditioning system which has shorter lengths of ducts for guiding room air and external air respectively, for reducing heat loss and pressure loss.

Additional features and advantages of the invention will be set forth in the description which follows, and in part will be apparent to those having ordinary skill in the art upon examination of the following or may be learned from practice of the invention. The objectives and other advantages of the invention will be realized and attained by the structure particularly pointed out in the written description and claims hereof as well as the appended drawings.

To achieve these objects and other advantages and in accordance with the purpose of the present invention, as embodied and broadly described herein, the air conditioning system includes an outdoor unit, an indoor unit, and air supply and air discharge duct. The outdoor unit includes a compressor and an outdoor heat exchanger. The indoor unit in a ceiling includes an indoor heat exchanger, a fan, guide means, and a preheat exchanger. The indoor heat exchanger has a space therein in communication with a room, and the fan is in the space for drawing air and discharging through the indoor heat exchanger. The guide means is provided on an underside of the indoor heat exchanger, for guiding the external air to the room through the fan, and the room air to an outside of the room. The preheat exchanger is arranged adjacent to, and in communication with the guide means, for indirect heat exchange of the external air and room air passing therethrough. The air supply duct and the air discharge duct are respectively connected to the preheat exchanger, for guiding the external air to the room, and the room air to the outside of the room.

The fan includes a centrifugal fan that draws air from under and discharges in a radial direction as the fan rotates.

The guide means may include a first duct arranged under the indoor heat exchanger for guiding the external air from the preheat exchanger to the fan, and a second duct arranged under the first duct for guiding the room air to the preheat exchanger. The guide means is formed as one unit.

The guide means may include a first hole provided in a central part thereof in an up/down direction such that the space and the room are in communication, at least one or more than one second hole provided around the first hole in the up/down direction such that the air passed through the indoor heat exchanger is introduced into the room.

In this case, it is preferable that the fan is provided over the first hole, and the indoor heat exchanger stands on a top of the guide means along a position between the first hole and the second hole.

The first duct may include at least one or more than one first inlet provided to one side surface thereof in communication with the preheat exchanger, and at least one or more than one first outlet formed in an inside surface thereof in communication with the first hole. The first duct may further include a first mesh provided to the first outlet for removing foreign matters from the air.

The second duct may include at least one or more than one second inlet provided in an inside surface thereof in communication with the first hole, and at least one or more than one second outlet provided in one side surface thereof in communication with the preheat exchanger. The second duct may further include a second mesh provided to the second outlet for removing foreign matters from the air.

In the meantime, the preheat exchanger may be arranged to surround an outside circumferential surface of the guide means. The preheat exchanger may include a plurality of units in communication with one another. The unit includes a vacant case having a third outlet in communication with the first inlet of the guide means, and a fourth inlet in communication with the second outlet of the guide means, and means in the case for indirect heat exchange between the external air passing through the first inlet and the third outlet, and the room air passing through the second outlet and the fourth inlet.

The heat exchange means may include first flow passages arranged at regular intervals for flow of the external air, and second flow passages arranged between, and in contact with the first flow passages, for flow of the room air.

The heat exchange means may include a plurality of plates arranged at regular intervals to form the first flow passages for flow of the external air and the second flow passages for flow of the room air in layers alternately, and a plurality of flow guides between the plates of the layers in parallel to flow directions of the external air and the room air, each having a cross section with continuous folds. In this case, the fold has a peak and a bottom in contact with a top surface and a bottom surface of the plates. The flow guides are arranged perpendicular to each other for perpendicular flow of the external air and the room air.

In the meantime, the air conditioning system may further include an air supply fan in the air supply duct for supplying the external air to the room. The air conditioning system may further include an air discharge duct in the air discharge duct for discharging the room air to the outside of room.

It is to be understood that both the foregoing description and the following detailed description of the present invention are exemplary and explanatory and are intended to provide further explanation of the invention claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENT

Reference will now be made in detail to the preferred embodiments of the present invention, examples of which are illustrated in the accompanying drawings. In describing the embodiments, same parts will be given the same names and reference symbols, and repetitive description of which will be omitted.

Figure 2:
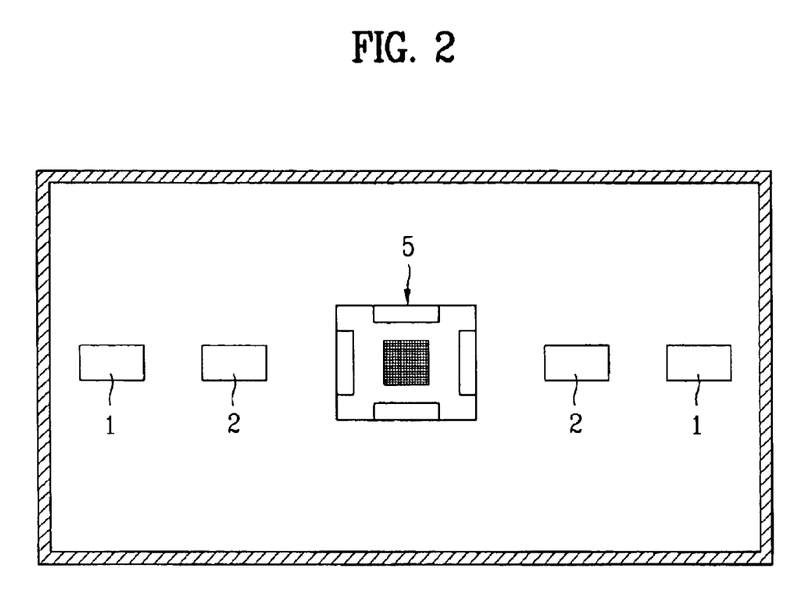
FIG. 2 illustrates a view of the air conditioning system in FIG. 1 installed on a ceiling looked up from below.
Figure 3:
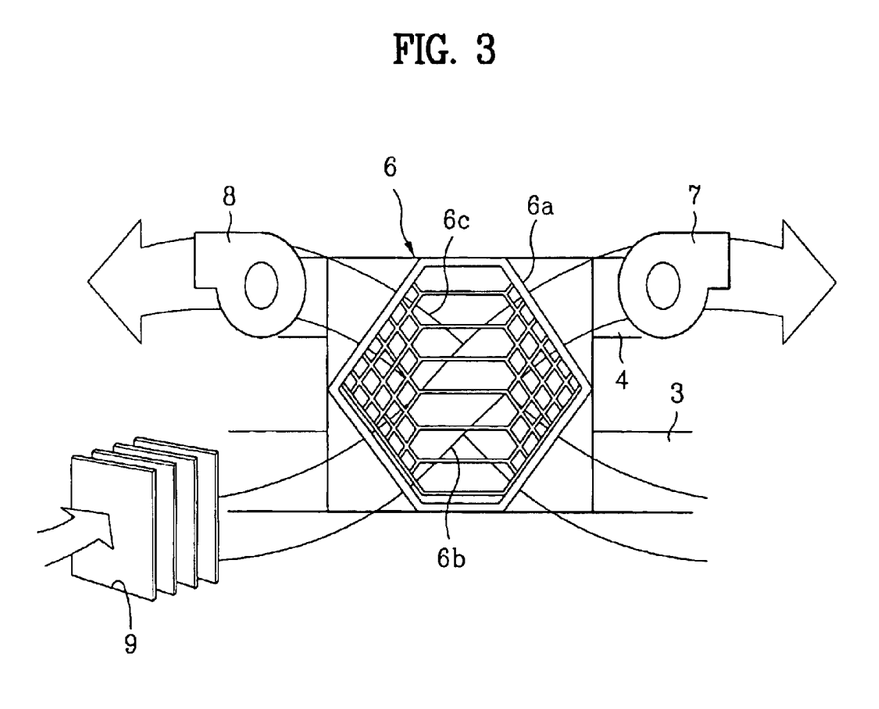
FIG. 3 illustrates heat exchange between external air and room air in the air conditioning system in FIG. 1, schematically.

The air conditioning system of the present invention provides a ceiling type air conditioner in which an indoor unit is installed in a ceiling. The air conditioning system of the present invention ventilates room air, during which the air supplied to a room recovers heat from the air discharged to an outside of room. The air conditioning system of the present invention will be described with reference to the attached drawings, in more detail. For reference, FIG. 1 illustrates an air conditioning system in accordance with a preferred embodiment of the present invention schematically, FIG. 2 illustrates a view of the air conditioning system in FIG. 1 installed on a ceiling looked up from below, and FIG. 3 illustrates heat exchange between external air and room air in the air conditioning system in FIG. 1, schematically.

Figure 1:
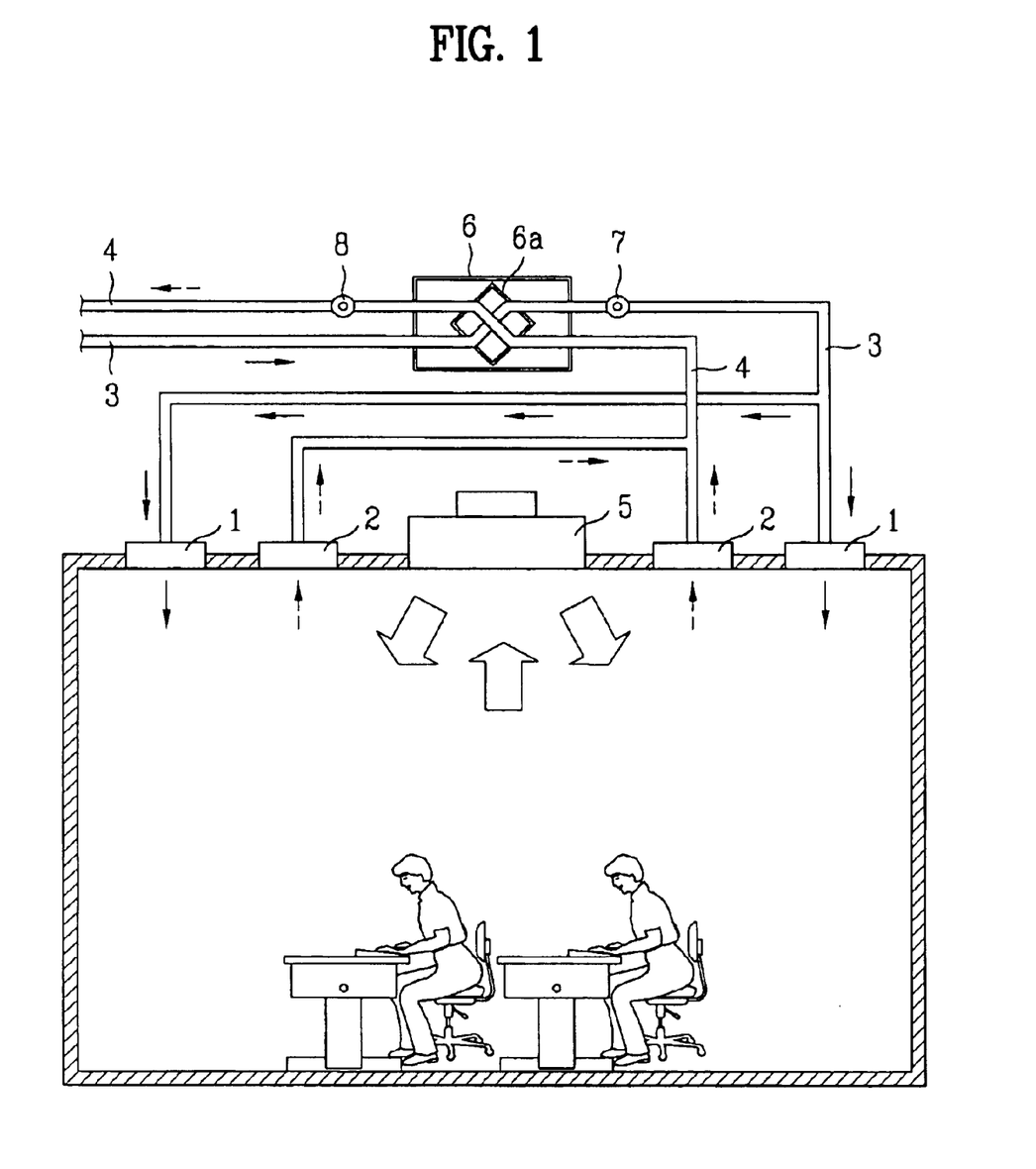
FIG. 1 illustrates an air conditioning system in accordance with a preferred embodiment of the present invention, schematically.

Referring to FIG. 1, an indoor unit 5 is installed in the ceiling of a room so as to be in communication with the room. The indoor unit 5 includes an indoor heat exchanger (not shown), an indoor expansion device (not shown), and an indoor fan (not shown). As shown in FIG. 2, there are a plurality of air discharging ports and air supply ports 1 in the ceiling in the room at points predetermined distances away from the indoor unit 5. The air discharge duct 4 is connected to the air discharge port 2, and the air supply duct 3 is connected to the air supply port 1. One ends of the air supply duct 3 and the air discharge ducts 4 are connected to the outside of the room. There is a preheat exchanger 6 in the middle of the air supply duct 3 and the air discharge duct 4 for indirect heat exchange of external air and room air flowing therein while the external air and the room air cross each other. There are an air supply fan 3a and an air discharge fan 4a mounted on the air supply duct 3 and the air discharge duct 4a, respectively. In the meantime, the outdoor unit 7 in an outdoor includes an outdoor heat exchanger (not shown), and a compressor (not shown), which are identical to known outdoor unit, and no more description of which will be provided.

In the operation, referring to FIG. 1, when the outdoor unit and the indoor unit 5 are put into operation, the room air is introduced into the indoor unit 5, heat exchanges with the indoor heat exchanger, and discharged to the room, again. According to this, the room is cooled or heated. After the room is cooled or heated for a time period, ventilation is required, of which process will be described.

In the ventilation, the air discharge fan 8 and the air supply fan 7 are operated. According to this, the external air is introduced into the room through the air supply duct 3 and the air supply port 1, and the room air is discharged to the outside of the room through the air discharge duct 4 and the air discharge port 2. In this instance, the room air and the external air flowing through the air discharge duct 4 and the air supply duct 3 indirectly heat exchange at the preheat exchanger 6. Therefore, the external air receives a portion of thermal energy from the room air discharged to the outside of the room, before introduction into the room, according to which loss of thermal energy caused in the ventilation can be reduced. The structure and operation of the preheat exchanger 6 will be described with reference to FIG. 3.

Referring to FIG. 3, there is heat exchange means 6a in the preheat exchanger 6, including a plurality of guide passages 6b for guiding the external air to the room, and a plurality of second guide passages 6c for guiding room air to the outside of the room. The first guide passages 6b and the second guide passages 6c are separated with a plurality of plates, so as not to be in communication. The first guide passage 6b and the second guide passage 6c are formed between the plates. Therefore, when the external air and the room air respectively pass through the first guide passage 6b and the second guide passage 6c, heat transfer is made through the plates. Accordingly, the external air introduced into the room through the first guide passage 6b receives heat from the room air discharged to the outside of the room through the second guide passage 6c. Therefore, the air conditioning system of the present invention can reduce energy loss in ventilation. In the meantime, the unexplained reference symbol 9 denotes a filter, for filtering the air introduced into the room from the outside of the room.

The foregoing air conditioning system of the present invention recovers the thermal energy of the room air discharged to the outside of room with the air supplied to the room in ventilation. According to this, rapid change of the room temperature in the ventilation can be prevented, and an energy saving effect can be obtained. However, despite of the advantages, the air conditioning system described with reference to FIGS. 1 and 3 has the following problems.

First, the air discharge duct in the ceiling of the room is long and complicate, and the preheat exchanger is mounted in the middle of the air supply, and air discharge ducts, making it is difficult to make the indoor unit and the preheat exchanger compact, difficult to install, and to require much material and installation cost.

Second, since the air supply, and discharge ducts to the preheat exchanger in the ceiling is long, heat loss and pressure loss are occurred, that make the preheat exchange efficiency in ventilation poor.

Therefore, an improved air conditioning system that can solve the foregoing problem is provided. FIGS. 4–9 illustrate the improved air conditioning system in accordance with a first preferred embodiment of the present invention. The improved air conditioning system in accordance with a first preferred embodiment of the present invention will be described with reference to above drawings.

Figure 4:
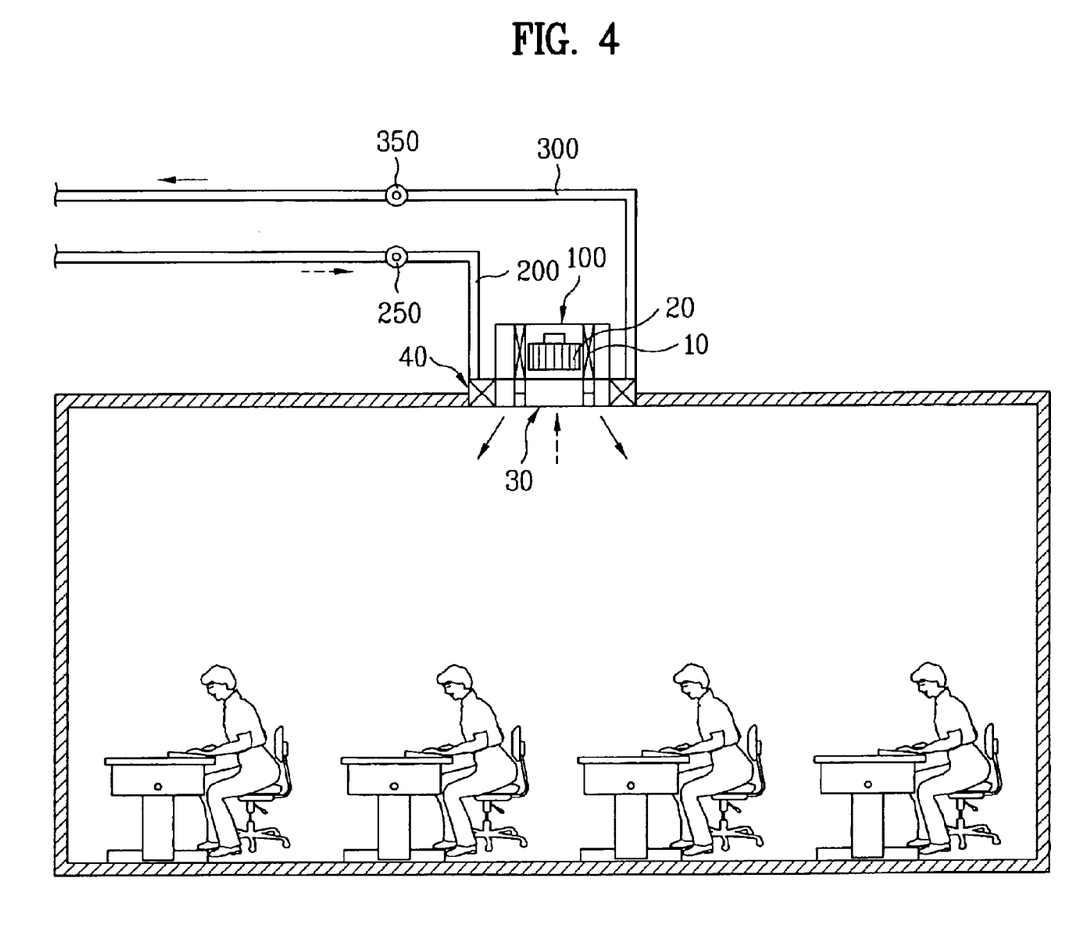
FIG. 4 illustrates an air conditioning system of an improved structure in accordance with a first preferred embodiment of the present invention.

Referring to FIG. 4, the indoor unit 100 is installed at one point in the ceiling in the room so as to be in communication with the room. The indoor unit 100 has the air supply duct 200 and the air discharge duct 300 connected thereto, respectively. Ends of the air supply duct 200 and the air discharge duct 300 are mounted to be in communication with an outside of room, respectively. An air supply fan 250 and an air discharge fan 350 are mounted on the air supply duct 200 and the air discharge duct 300 respectively, for improving air supply and air discharge capabilities.

In the meantime, though not shown, the outdoor unit is installed in an outdoor, which includes a compressor, an outdoor expansion device, and an outdoor fan. The outdoor unit, similar to known outdoor unit, will not be described, additionally. Of course, the outdoor unit and the indoor unit 100 are connected with refrigerant pipelines.

Figure 5:
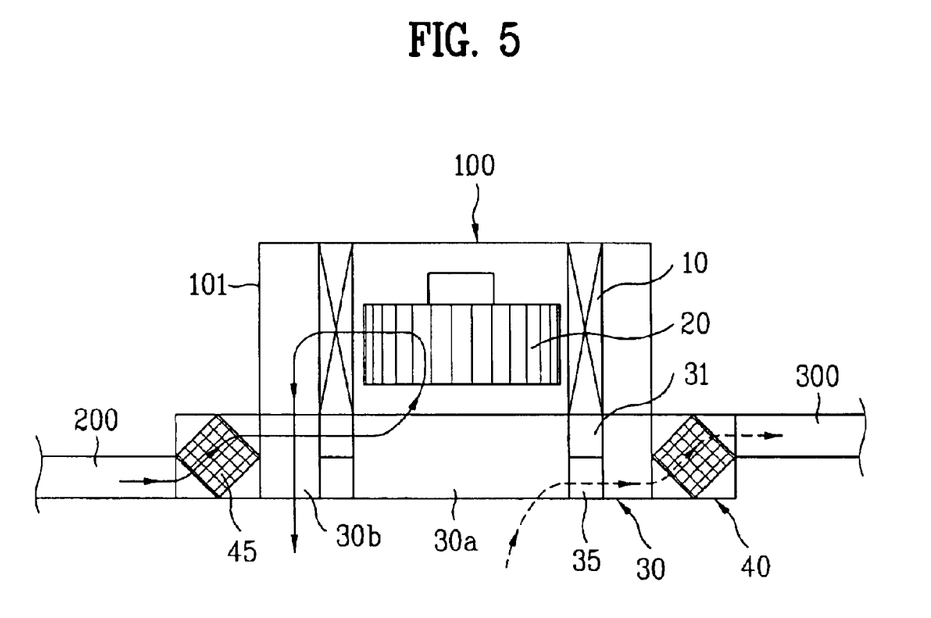
FIG. 5 illustrates a section showing an improved air conditioning system in accordance with a first preferred embodiment of the present invention, schematically.

In the meantime, referring to FIG. 5, the indoor unit 100 includes an indoor heat exchanger 10, a fan 20, guide means 30, and a preheat exchanger 40. As shown in FIG. 5, the indoor heat exchanger 10 is mounted in an indoor unit case 101, and has a form with an inside space in communication with the room. The indoor heat exchanger 10 may have a form, for an example, surrounding the space. In this case, the space may be in communication with the room through an opened bottom side of the indoor heat exchanger 10. In the meantime, referring to FIG. 5, it is preferable that an outside circumferential surface of the indoor heat exchanger 10 and an inside circumferential surface of the indoor unit case 101 has a fixed distance, for securing a flow passage so that the air discharged from the fan 20 and passed through the indoor heat exchanger 10 moves toward the room.

Referring to FIG. 5, the fan 20 is mounted in the space in the indoor heat exchanger 10. The fan 20 draws air, and discharges into the room through the indoor heat exchanger 10. In the meantime, it is preferable that the fan 20 provided to the air conditioning system in accordance with a first preferred embodiment of the present invention includes a centrifugal fan that draws air from one side, for an example, from a bottom side, and discharges in a radial direction. In this case, referring to FIG. 5, the centrifugal fan is mounted in the inside space of the indoor heat exchanger 10, for drawing room air through the bottom side and discharges the room air in the radial direction. Then, the air discharged in the radial direction passes through the indoor heat exchanger 10 mounted to surround the centrifugal fan, and moves toward the room.

Referring to FIG. 5, the guide means 30 is provided under the indoor heat exchanger 10. The guide means 30 guides the external air introduced through the air supply duct 200 to the room via the fan 20, and the room air to the outside of the room via the air discharge duct 300. The guide means 30 is shown well in FIGS. 6 and 7. Therefore, the guide means 30 will be described in more detail, with reference to FIGS. 6 and 7.

Figure 6:
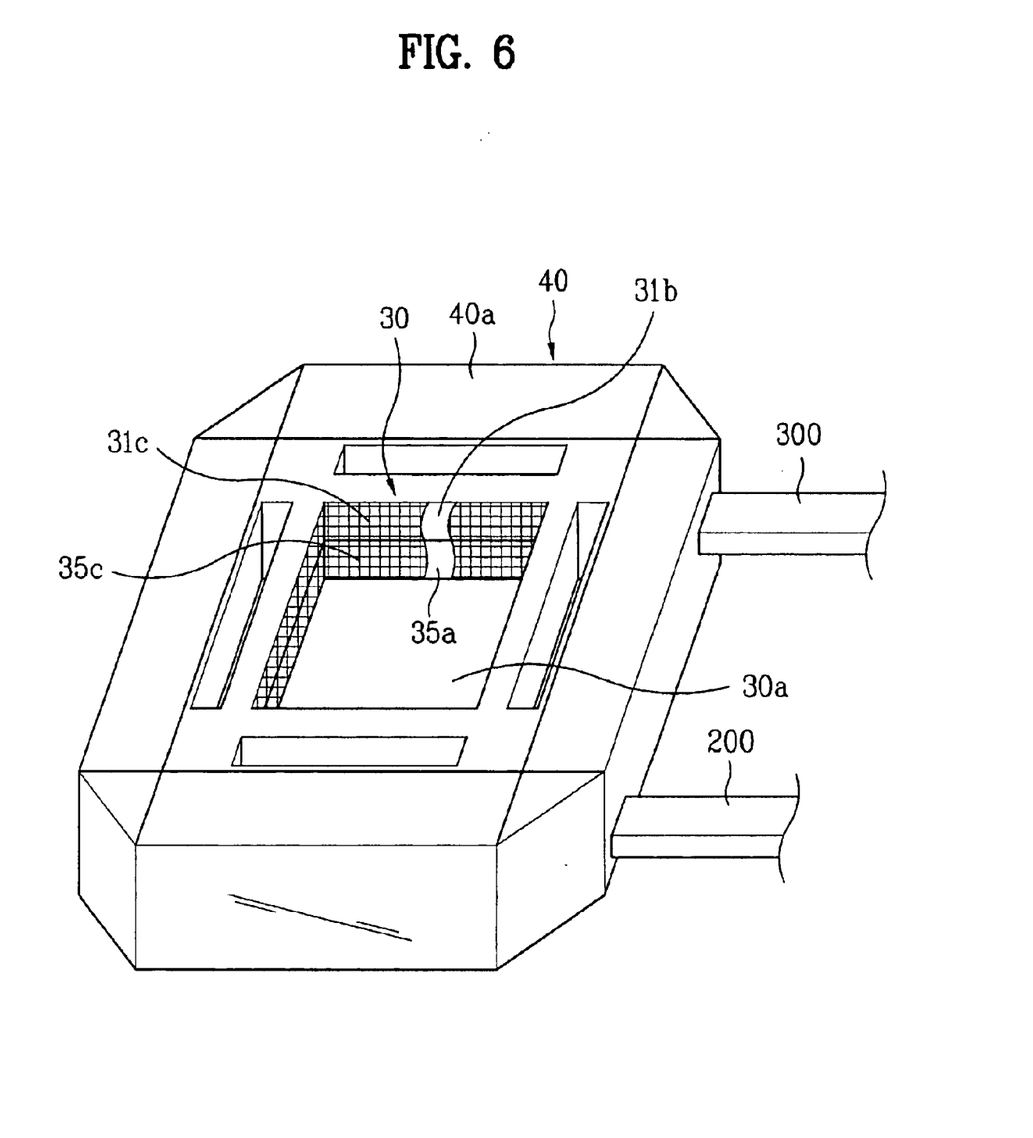
FIG. 6 illustrates a perspective view showing the preheat exchanger and the guide means in the air conditioning system in FIG. 4.
Figure 7:
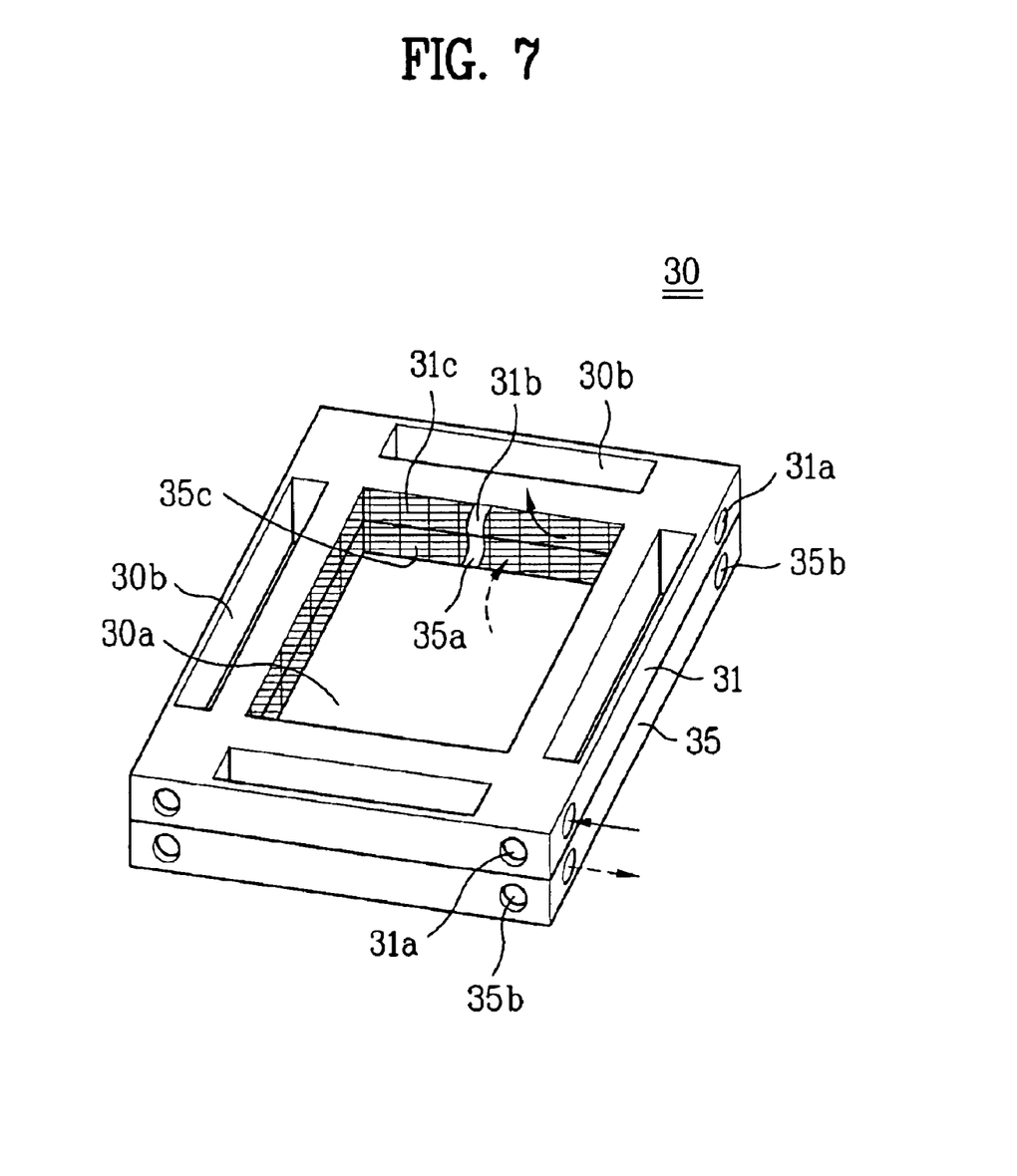
FIG. 7 illustrates a perspective view showing the guide means in FIG. 6.

Referring to FIGS. 6 and 7, the guide means 30 includes a first duct 31 and a second duct 35. As shown in FIG. 5, the first duct 31 is arranged under the indoor heat exchanger 10, and the second duct 35 is arranged under the first duct 31. The first duct 31 guides the external air passed through the air supply duct 200 and the preheat exchanger 40 to the fan 20. The second duct 35 guides the room air to the outside of the room through the preheat exchanger 40 and the air discharge duct 300. The guide means 30 may be a unitized body having the first duct 31 and the second duct 35 attached thereto, rigidly.

Referring to FIGS. 6 and 7, the guide duct 30 has a plurality of holes in an up/down direction. Of the holes, as shown in FIGS. 5 to 7, the first hole 30a passes central parts of the guide means 30, i.e., the first duct 31 and the second duct 35 in the up/down direction to make the space in the indoor heat exchanger 10 and the room in communication. As shown in FIGS. 5 to 7, the second hole 30b passes the guide means 30, i.e., the first duct 31 and the second duct 35 around the first hole 30a in the up/down direction such that the air passed through the indoor heat exchanger 10 passes therethrough and is introduced into the room. At least one or more than one second hole 30b is provided, and in a case a plurality of the second holes 30b are provided, it is preferable that the second holes 30b are provided at regular intervals around the first hole 30a.

In a case the first hole 30a and the second hole 30b are provided to the guide means 30 thus, it is preferable that fan 20 is mounted over the first hole 30a, and the indoor heat exchanger 10 stands on top of the first duct 31 between the first hole 30a and the second hole 30b.

In the meantime, the first duct 31 and the second duct 35 have a plurality of inlets and outlets for introduction/discharge of the external air and the room air, respectively. The inlets and outlets, provided in an outside circumferential surface and an inside circumferential surface of the first duct 31 and the second duct 35, will be described in more detail, with reference to FIG. 7. For reference, FIGS. 6 and 7 illustrate an embodiment in which the guide means 30, i.e., the first duct 31 and the second duct 35 are rectangular. However, the guide means 30 may have, for an example, a donut form, or the inside circumferential surface and the outside circumferential surface of the guide means 30 may have a variety of forms of a pentagon, hexagon, or octagon, respectively. Therefore, as shown in FIGS. 6 and 7, the form of the guide means 30 is not limited to the embodiments shown as far as the form has a central first hole 30a with the outside circumferential surface.

At least one first inlet 31a is provided in the outside circumferential surface of the first duct 31, for introduction of the external air into the first duct 31. The first inlet 31a is in communication with the preheat exchanger 40 to be described in detail. As shown in FIGS. 6 and 7, at least one first outlet 31b is provided in the inside circumferential surface in communication with the first hole 30a for guiding the external air from the first duct 31 to the fan 20. The first outlet 31b provided thus in the inside circumferential surface of the first duct 31 may be provided with a first mesh 31c for removing foreign matters from the air.

Referring to FIGS. 6 and 7, at least one second inlet 35a is provided in an inside circumferential surface of the second duct 35 so as to be in communication with the first hole 30a for introduction of the room air into the second duct 35. Alike the first outlet 31b, the second inlet 35a may be provided with a second mesh 32c for removing foreign matters from the room air. In the meantime, as shown in FIG. 7, at least one second outlet 35b is provided in an outside circumferential surface of the second duct 35 for discharging the room air from the second duct 35 to the outside of the room. The second outlet 35b formed thus is in communication with the preheat exchanger 40 to be described in more detail as follows.

In the meantime, the preheat exchanger 40 is provided adjoining to the guide means 30 so as to be in communication with the guide means 30. As shown in FIGS. 5 and 6, the preheat exchanger 40 is arranged to surround the outside circumferential surface of the guide means 30, or, though not shown, under the guide means 30.

The preheat exchanger 40 recovers thermal energy by making the external air and the room air flowing therein to make indirect heat exchange. For this, the preheat exchanger 40 has, not only the guide means 30, but also the air discharge duct 300 and the air supply duct 200 connected thereto. FIGS. 4 to 8 illustrate diagrams of an embodiment in which the preheat exchanger 40 is arranged to surround the outside circumferential surface of the guide means 30. A structure of the preheat exchanger 40 will be described in detail, with reference to FIGS. 6, 8, and 9.

Figure 8:
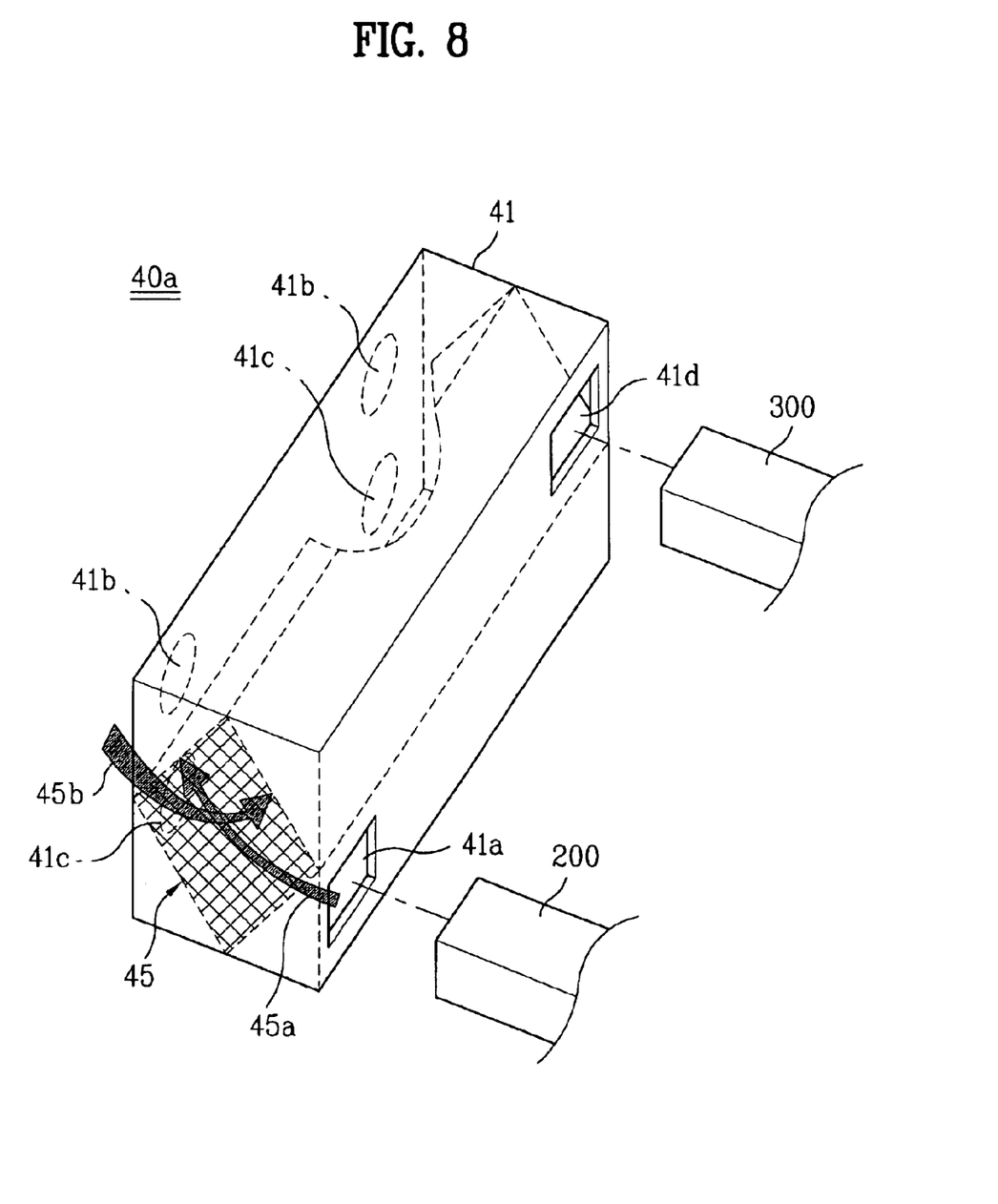
FIG. 8 illustrates a diagram showing the preheat exchanger in FIG. 6, schematically.

Referring to FIGS. 6 and 8, the preheat exchanger 40 arranged to surround the outside circumferential surface of the guide means 30, i.e., the first duct 31 and the second duct 35, and includes a plurality of units in communication with each other. The reason the preheat exchanger 40 has the plurality of units to surround the outside circumferential surface of the guide means 30 is for fabricating a compact indoor unit 100, and improving fabrication and assembly works.

Referring to FIG. 8, each of the units 40a of the preheat exchanger 40 includes a case 41, and heat exchange means 45. The case 41 has a vacant inside, and a plurality of inlets and outlets for making the inside and outside in communication. In more detail, a third outlet 41b is provided in the case 41 so as to be in communication with the first inlet 31a in the guide means 30, and a fourth inlet 41c is provided in the case 41 so as to be in communication with the second outlet 35b in the guide means 30. The third outlet 41b and the fourth inlet 41c are formed in one of surfaces of the case 41 of the preheat exchanger 40 in contact with the outside circumferential surface of the guide means 300.

In the meantime, referring to FIG. 8, a third inlet 41a is provided in the case 41 in the unit so as to be in communication with the air supply duct 200, and a fourth outlet 41d is provided in the case 41 so as to be in communication with the air discharge duct 300. It is preferable that only one air supply duct 200 and the air discharge duct 300 are provided. This is for reducing unnecessary thermal, and pressure losses by providing only one air supply duct 200 and air discharge duct 300, because a total length of each of the ducts becomes greater to increase the thermal loss and the pressure loss, if a plurality of the air supply ducts 200 and the air discharge ducts 300 are provided. In this case, the third inlet 41a and the fourth outlet 41d respectively connected to the air supply duct 200 and the air discharge duct 300 are provided only one of the plurality of units.

In the meantime, referring to FIG. 8, the heat exchange means 45 is provided in the case 41, for indirect heat exchange between the external air passed through the first inlet 31a and the third outlet 41b, and the room air passed through the second outlet 35b and the fourth inlet 41c. The heat exchange means 45 includes a first flow passage for flow of the external air and a second flow passage for flow of the room air.

The first flow passage and the second flow passage are not in communication, and have structures in which the external air and the room air flowing therethrough have effective heat exchange. For an example, if the first flow passages are arranged at regular intervals, and the second flow passages are arranged between, and in contact with, the first flow passages, the external air and the room air flowing therethrough have effective heat exchange, while the first flow passage and the second flow passage are not in communication.

Figure 9:
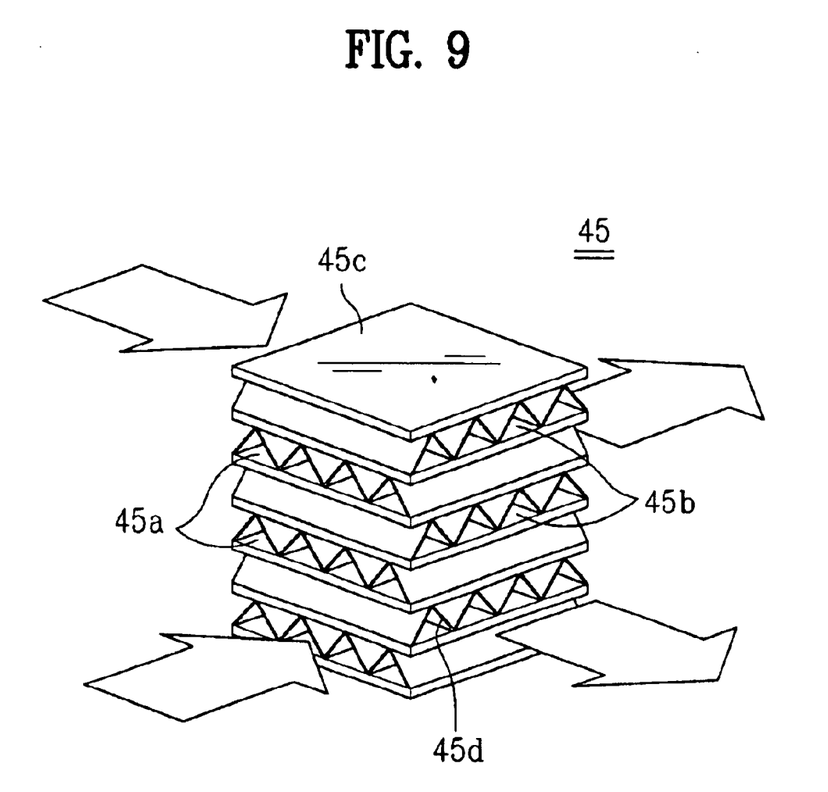
FIG. 9 illustrates a perspective view showing an embodiment of the heat exchange means in the preheat exchanger in FIG. 8.

FIG. 9 illustrates an embodiment of the heat exchange means 45. Referring to FIG. 9, the one embodiment of the heat exchange means 45 includes a plurality of plates 45c and a plurality of flow guides 45d. The plates 45c are arranged at regular intervals such that the first flow passage 45a for flow of the external air and the second flow passage 45b for flow of the room air are formed in layers, alternately.

The flow guide 45d serves to fix flow directions of the air flow in the first passage 45a and the second flow passage 45b, and to make a heat exchanger area larger. The flow guide 45d includes a section having a plurality of continuous folds, of which peaks and bottoms are in contact with a top surface and a bottom surface of each of the plates, respectively. In the meantime, as shown in FIG. 9, the flow guides 45d in the layers may be arranged perpendicular to each other so that the external air and the room air flow perpendicular to each other.

The first flow passage 45a in the heat exchanger means 45 for flow of the external air has one end in communication with the third outlet 41b connected to the first inlet 31a in the guide means 30, and the other end in communication with the third inlet 41a having the air supply duct 200 connected thereto. The second flow passage 45b for flow of the room air has one end in communication with the fourth inlet 41c connected to the second outlet 35b in the guide means 30, and the other end in communication with the fourth outlet 41d having the air discharge duct 300 connected thereto.

In the meantime, the heat exchange means 45 is not limited to the embodiments described with reference to FIG. 9, but any structure is adequate as the heat exchange means as far as the structure permits indirect heat exchange of the external air and the room air without mixed to each other.

The operation of the air conditioning system having an improved structure in accordance with the first preferred embodiment of the present invention will be described. When the fan 20 is put into operation in a state the air supply fan 250 and the air discharge fan 350 are not in operation, the room air moves upward through the first hole 31a in the guide means 30, and is discharged toward the indoor heat exchanger 10 by the fan 20. The air cooled down/heated up as the air heat exchanges at the indoor heat exchanger 10 is discharged to the room via the second hole 30b in the guide means 30, to cool down/heat up the room. In the meantime, in a state the air supply fan 250 and the air discharge fan 350 are not in operation, since air flow in the air supply duct 200 and the air discharge duct 300 are minimal, it is difficult to make an efficient ventilation.

In a case it is intended to ventilate the room after the room is cooled or heated for a preset time period through the foregoing process, the air supply fan 250 and the air discharge fan 350 are put into operation. In this instance, the outdoor unit and the indoor unit 100 may also be put into operation at the same time, or may not put into operation. When the discharge fan 350 is put into operation, the room air is introduced into the second duct 35 through the second inlet 35a, and introduced into the preheat exchanger 40 through the second outlet 35b and the fourth inlet 35a. In this instance, foreign matters are removed from the room air with the second mesh 35c on the second inlet 35a. The room air introduced into the preheat exchanger 40 flows through the second flow passage 45b, and discharged to the outside of the room through the fourth outlet 41d and the air discharge duct 300.

In the meantime, when the air supply fan 250 is put into operation, fresh external air is introduced into the preheat exchanger 40 through the air supply duct 200 and the third inlet 41a. The external air introduced into the preheat exchanger 40 flows through the first flow passage 45a. In this instance, since the room air flows through the second flow passage 45b in contact with the first flow passage 45a, the external air flowing through the first flow passage 45a receives heat from the room air, indirectly.

There can be two kinds of method for indirect heat exchange between the external air and the room air. One is heat exchange by means of heat conduction made through the plate 45c and the flow guide 45d that divide the first flow passage 45a and the second flow passage 45b. The other one is heat exchange by means of condensed water formed on the plate 45c due to a temperature difference between the first flow passage 45a and the second flow passage 45b.

In the meantime, the external air, received a thermal energy from the room air by above method as the external air passes through the heat exchange means 45 in the preheat exchanger 40 to be cooled down or heated up, is introduced into the first duct 31 in the guide means 30 through the third outlet 41b and the first inlet 31a. Then, after being introduced into the fan 20 via the first outlet 31b and the first hole 30a, the external air is cooled or heated at the indoor heat exchanger 10, again. The external air cooled or heated at the indoor heat exchanger 10 is discharged to the room through the second hole 30b in the guide means 30.

Advantages of the improved air conditioning system in accordance with a first preferred embodiment of the present invention will be described.

First, in ventilation, the air conditioning system of the present invention has the preheat exchanger 40 to transfer the thermal energy of room air discharged to the outside of the room to the external air supplied to the room. According to this, waste of the thermal energy during ventilation can be prevented, effectively.

Second, in ventilation, the external air cooled or heated primarily at the preheat exchanger 40 is cooled or heated again as the external air passes through the indoor heat exchanger 10, before being supplied to the room. Therefore, the sharp room temperature change in the ventilation can be prevented effectively. According to this, a comfortable environment can be provided to persons in the room.

Third, the air conditioning system of the present invention has the indoor heat exchanger, the indoor fan, the guide means, and preheat exchanger, which form an indoor unit assembly. Therefore, the indoor unit is very compact, permitting easy installation of the indoor unit in the ceiling.

Fourth, the air conditioning system of the present invention has a fewer number of ducts, and a shorter total length of the ducts connected to the compact indoor unit. Therefore, installation is easy, and material and fabrication costs can be reduced. Moreover, heat loss and pressure loss occurred at the ducts can be reduced, to improve an air conditioning efficiency.

Fifth, since the air conditioning system of the present invention, not only have the compact indoor unit, but also can dispense with separate air discharge ports, a room interior looks better.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An air conditioning system comprising:
an outdoor unit having a compressor and an outdoor heat exchanger;
an indoor unit installed in a ceiling, the indoor unit comprising:

an indoor heat exchanger defining a space therein in communication with a room;

a fan in the space that draws air in and that discharges air to the room through the indoor heat exchanger;

a guide apparatus on an underside of the indoor heat exchanger, the guide apparatus guiding external air to the room through the fan and room air from the room; and a preheat exchanger arranged adjacent to, and in communication with, the guide apparatus, the preheat exchanger indirectly exchanging heat between external air and room air passing therethrough; and an air supply duct and an air discharge duct respectively connected to the preheat exchanger, for guiding external air to the room and room air from the room.

2. The air conditioning system as claimed in claim 1, wherein the fan includes a centrifugal fan that draws air from below the fan and discharges in a radial direction as the fan rotates.

3. The air conditioning system as claimed in claim 1, wherein the guide apparatus includes:

a first duct arranged under the indoor heat exchanger for guiding external air from the preheat exchanger to the fan, and a second duct arranged under the first duct for guiding room air to the preheat exchanger.

4. The air conditioning system as claimed in claim 3, wherein the guide apparatus is formed as one unit.

5. The air conditioning system as claimed in claim 3, wherein the guide apparatus includes:

a first hole provided in a central part thereof in an up/down direction such that the space and the room are in communication, at least one second hole provided around the first hole in the up/down direction such that the air passed through the indoor heat exchanger is introduced into the room.

6. The air conditioning system as claimed in claim 5, wherein the fan is provided over the first hole.

7. The air conditioning system as claimed in claim 5, wherein the indoor heat exchanger is located on the guide apparatus between the first hole and the second hole.

8. The air conditioning system as claimed in claim 5, wherein the first duct includes:

at least one first inlet provided to one side surface thereof in communication with the preheat exchanger, and at least one first outlet formed in an inside surface thereof in communication with the first hole.

9. The air conditioning system as claimed in claim 8, wherein the first duct further includes a first mesh provided to the first outlet for removing foreign material from the air.

10. The air conditioning system as claimed in claim 5, wherein the second duct includes:

at least one second inlet provided in an inside surface thereof in communication with the first hole, and at least one second outlet provided in a side surface of the second duct in communication with the preheat exchanger.

11. The air conditioning system as claimed in claim 10, wherein the second duct further includes a second mesh provided to the second outlet for removing foreign material from the air.

12. The air conditioning system as claimed in claim 1, wherein the preheat exchanger is arranged to surround an outside circumferential surface of the guide apparatus.

13. The air conditioning system as claimed in claim 1, wherein the preheat exchanger includes a plurality of units in communication with one another.

14. The air conditioning system as claimed in claim 13, wherein the unit includes:

a hollow case having a third outlet in communication with a first inlet of the guide apparatus, and a fourth inlet in communication with a second outlet of the guide apparatus, and a heat exchanger that exchanges heat between external air passing through the first inlet and the third outlet, and room air passing through the second outlet and the fourth inlet.

15. The air conditioning system as claimed in claim 14, wherein the heat exchanger includes:

first flow passages arranged at regular intervals for flow of external air, and second flow passages arranged between, and in contact with, the first flow passages, for flow of room air.

16. The air conditioning system as claimed in claim 14, wherein the heat exchanger includes:

a plurality of plates arranged at regular intervals to form the first flow passages for flow of external air and the second flow passages for flow of room air in layers, alternately, and a plurality of flow guides between the plates of the layers in parallel to flow directions of external air and room air, each flow guide having a cross section with continuous folds.

17. An air conditioning system, comprising:

an outdoor unit having a compressor and an outdoor heat exchanger;

an indoor unit, installed in a horizontal surface of a room and defining a space therein in communication with the room, the indoor unit comprising:

an indoor heat exchanger;

a fan in the space that draws external air in and that discharges external air to the room through the indoor heat exchanger, a guide apparatus that includes a first upper guide, on an underside of the indoor heat exchanger, that guides external air to the room through the fan, and a second lower guide, on the underside of the indoor heat exchanger, that guides room air from the room; and a preheat exchanger, in communication with the guide apparatus, that indirectly exchanges heat between external air and room air; and an air supply duct and an air discharge duct, each connected to the preheat exchanger, for supplying external air to the room and for discharging room air from the room.

18. The air conditioning system of claim 17, the fan comprising:

a centrifugal fan that draws air in vertically and discharges air radially as the fan rotates.

19. The air conditioning system of claim 17, wherein the first guide includes a first duct under the indoor heat exchanger, and wherein the second guide includes a second duct under the first duct.

20. The air conditioning system of claim 19, wherein the first guide and second guide are formed as a single unit.

21. The air conditioning system of claim 19, wherein the guide apparatus defines a first centrally positioned vertically extending hole configured such that the space and the room are in communication, and wherein the guide apparatus defines at least one second vertically extending hole positioned about the first hole such that the air passed through the indoor heat exchanger is introduced into the room.

22. The air conditioning system of claim 21, wherein the fan is provided over the first hole.

23. The air conditioning system of claim 21, wherein the indoor heat exchanger is positioned on the guide apparatus between the first hole and the second hole.

24. The air conditioning system of claim 21, the first duct comprising:
- at least one first inlet provided in a side surface of the first duct in communication with the preheat exchanger, and
- at least one first outlet formed in an inner surface of the first duct in communication with the first hole.

25. The air conditioning system of claim 24, the first duct further comprising:
- a first filter provided to the first outlet for removing foreign material from the air.

26. The air conditioning system of claim 21, the second duct comprising:
- at least one second inlet provided in an inner surface of the second duct in communication with the first hole, and
- at least one second outlet provided in a side surface of the second duct in communication with the preheat exchanger.

27. The air conditioning system of claim 26, the second duct further comprising:

a second filter provided to the second outlet for removing foreign material from the air.

28. The air conditioning system of claim 17, wherein the preheat exchanger is configured to surround an outside circumferential surface of the guide apparatus.

29. The air conditioning system of claim 17, wherein the preheat exchanger includes a plurality of units in communication with one another.

30. The air conditioning system of claim 29, wherein each unit comprises:
- a case having a third outlet in communication with a first inlet of the guide apparatus, and a fourth inlet in communication with a second outlet of the guide apparatus, and
- a preheat exchanger configured to provide indirect heat exchange between external air passing through the first inlet and the third outlet, and the air passing through the second outlet and the fourth inlet.

31. The air conditioning system of claim 30, the preheat exchanger comprising:
- first flow passages arranged at regular intervals for flow of external air, and second flow passages arranged between the first flow passages for flow of room air.

32. The air conditioning system of claim 31, the preheat exchanger comprising:
- a plurality of plates arranged at regular intervals to form the first flow passages for flow of external air and the second flow passages for flow of room air, the plates forming the first flow passages and the plates forming the second flow passages being arranged in alternate layers alternately, and
- a plurality of flow guides between the plates of the layers in parallel to flow directions of external air and room air, each flow guide having a cross section defined by continuous folds.

* * * * *